3,164,527
NUCLEAR REACTOR VAPOR GENERATING
PLANT
Alfred Brunner, Winterthur, Switzerland, assignor to Sulzer Freres, S.A., Winterthur, Switzerland, a corporation of Switzerland
Filed Mar. 26, 1962, Ser. No. 182,204
Claims priority, application Switzerland Apr. 28, 1961
5 Claims. (Cl. 176—59)

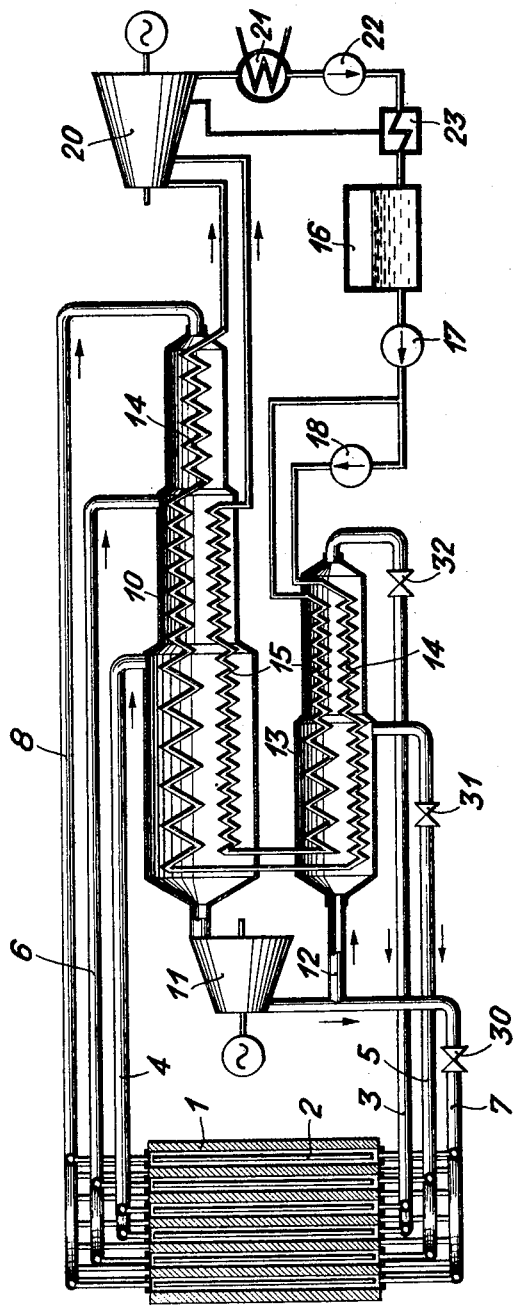

The invention relates to a nuclear reactor plant wherein the heat generated in the reactor is absorbed by a coolant and is transmitted in a heat exchanger to a working medium vaporizable at the plant pressures and temperatures and producing mechanical power in a turbine.

It is known to cool nuclear reactors by a flowing gaseous coolant and to feed said coolant to a heat exchanger for generating steam driving turbines. It is also known to arrange a plurality of steam generators in the stream of the gaseous coolant, the steam generators operating at different pressures and, therefore, also at different evaporation temperatures, whereby a higher thermal efficiency of the plant is obtained.

The object of the invention is to provide a vapor generating plant deriving its heat from a nuclear reactor and operating at a higher thermal efficiency than conventional plants of this type without making the plant more complicated and less simple than the conventional plants. To obtain this object the working medium of a plant according to the invention is conducted through coils forming part of a heat exchanger, the coils being so arranged that there is a countercurrent of the operating medium with respect to the reactor coolant which is the heating agent in the heat exchanger. The reactor is subdivided into zones generating different amounts of heat and having different coolant inlet and outlet temperatures, the coolant being fed to the heat exchanger and discharged from the latter through pipe lines at different stations according to its temperature. The heat exchanger is subdivided into at least two parts through which the coolant flows successively and between which parts a blower is provided for circulating the coolant through the heat exchanger and through the reactor.

The novel features which are considered characteristic of the invention are set forth with particularity in the appended claims. The invention itself, however, and additional objects and advantages thereof will best be understood from the following description of an embodiment thereof when read in connection with the accompanying drawing, the one figure of which diagrammatically shows a plant according to the invention.

Referring more particularly to the drawing, numeral 2 designates fuel rods disposed in a reactor core 1 and cooled by a gaseous coolant, for example $CO_2$. The fuel rods are arranged in a plurality of concentric groups forming heating zones generating different amounts of heat. The innermost group or zone to which the coolant is supplied through a pipe line 3 and from which the coolant is discharged through a pipe line 4, generates most heat and must, therefore, have the lowest coolant outlet temperature, considering the temperature drop in the fuel rods and in the metal canning surrounding the rods. Consequently, the coolant entering this zone must have the lowest temperature of all coolants entering the reactor. The fuel rods of the intermediate zone receive coolant at a somewhat higher temperature through a pipe line 5 which coolant is discharged through a pipe line 6 at a higher temperature than the temperature of the coolant flowing through the pipe 4. Coolant is fed to the outer fuel rods through a pipe line 7 at an inlet temperature which is higher than the temperature of the coolants supplied through pipes 3 and 5 and is discharged through a pipe line 8 at the maximum coolant temperature of the system. The coolant from the pipes 4, 6, 8 is fed to different temperature zones of a first part 10 of a heat exchanger, the coolant from pipe 4, having the relatively lowest temperature, being fed into the lowest temperature zone of the heat exchanger 10, the coolant from pipe 8, having the relatively highest temperature, being fed into the highest temperature zone of the heat exchanger, and the coolant from the pipe 6 being fed into an intermediate temperature zone of the heat exchanger. The reactor coolant leaves the part 10 of the heat exchanger through an outlet which is connected to a circulating blower 11 discharging the coolant into the pipe line 7. A pipe line 12 branches from the pipe line 7 and is connected to a second part 13 of the heat exchanger. The coolant leaving the part 13 of the heat exchanger flows into the pipe line 3. Part of the coolant flowing through the heat exchanger part 13 is tapped from an intermediate temperature zone of the heat exchanger and is conducted into the pipe line 5. Throttling elements 30, 31, 32 afford control of the quantity of coolant flowing per time unit through the pipes 7, 5 and 3, respectively. Both portions 10 and 13 of the heat exchanger contain coils 14, 15 forming a forced flow steam generator. The operating medium of this steam generator flows in liquid state from a tank 16 to a feed pump 17 and therefrom into the coil 15. Some of the water discharged by the pump 17 is brought to a higher pressure by a pump 18 and fed to the coil 14. The steam generated in the coil 14 is conducted to the inlet of a turbine 20. The steam generated in the coil 15, whose pressure is lower than that of the steam in the coil 14, is fed to an intermediate pressure stage of the turbine 20. The exhaust steam of the turbine 20 flows to a condenser 21. The condensate is returned to the tank 16 by a condensate pump 22 through a preheater 23.

The nuclear reactor vapor generating plant according to the invention gives optimum thermal efficiency. By the arrangement of the circulating blower between two parts of a heat exchanger a plurality of separate coolant streams of different temperatures can be circulated through the reactor by means of a single blower or circulating pump.

With the arrangement according to the invention the circulating blower pumps coolant of a relatively low temperature whereby the power required for driving the blower is reduced and the life of the blower is prolonged.

The heat exchanger need not comprise two separate vessels, as shown. A single vessel may be divided by a partition to form two chambers and the coolant may be passed through the circulating blower between the chambers.

It is obvious that more than three different temperature zones may be provided in the reactor. A greater number of steam generating coils operating at different pressures than the two shown in the example may be provided.

I claim:
1. A nuclear reactor vapor generating plant comprising:
 a nuclear reactor including a plurality of nuclear fuel elements forming a plurality of heating zones generating different amounts of heat,
 means for passing a gaseous coolant in separate streams through said heating zones,
 heat exchange means having a first portion including a plurality of consecutive heating zones operating at different temperatures,
 means for conducting the coolant stream passing through the reactor heating zone generating the greatest amount of heat into the relatively coolest heating zone of said portion of said heat exchange means, means for conducting the coolant stream passing through the reactor heating zone generating the lowest amount of heat into the relatively hottest heating zone of said portion of said heat exchange means,
a coolant circulating pump connected to the relatively coolest heating zone of said portion of said heat exchange means for receiving the coolant therefrom,
said heat exchange means having a second portion, said second portion including a plurality of consecutive heating zones operating at different temperatures,
the hottest heating zone of said second portion being connected to said pump for receiving coolant therefrom,
the hottest heating zone of said second portion being connected to said means for passing coolant through a heating zone of said reactor generating a relatively small amount of heat for conducting coolant thereto,
the coolest heating zone of said second portion being connected to said means for passing coolant through the reactor heating zone generating the greatest amount of heat, for conducting coolant thereto,
tubular conduit means extending through said second portion of said heat exchange means consecutively through heating zones thereof operating at consecutively increasing temperatures and subsequently extending through said first portion of said heat exchange means consecutively through heating zones thereof operating at consecutively increasing temperatures, and
means for flowing an initially liquid operating medium through said tubular conduit means in the direction of the extension of said tubular conduit means through said portions of said heat exchange means for evaporating said operating medium.

2. A plant as defined in claim 1 wherein said pump is also connected to said means for passing coolant through a reactor heating zone generating less heat than the reactor heating zone whereto the hottest heating zone of said second portion is connected, for conducting coolant thereto.

3. A plant as defined in claim 1 wherein said pump is also connected to said means for passing coolant through the reactor heating zone generating the smallest amount of heat, for conducting coolant thereto.

4. A plant as defined in claim 1 wherein said tubular conduit means comprise at least two separate tubes conducting operating medium at different pressures.

5. A plant as defined in claim 1 wherein said operating medium is water.

References Cited in the file of this patent

UNITED STATES PATENTS

| | | |
|---|---|---|
| 3,069,342 | Flatt | Dec. 18, 1962 |

FOREIGN PATENTS

| | | |
|---|---|---|
| 792,171 | Great Britain | Mar. 19, 1958 |
| 858,504 | Great Britain | Jan. 11, 1961 |
| 880,697 | Great Britain | Oct. 25, 1961 |
| 887,142 | Great Britain | Jan. 17, 1962 |
| 1,251,823 | France | Dec. 12, 1960 |